May 23, 1944.    A. SCOTT    2,349,383
AIRCRAFT ENGINE
Filed April 9, 1941    3 Sheets-Sheet 1

Andrew Scott.
INVENTOR
BY Victor J. Evans & Co.
ATTORNEYS

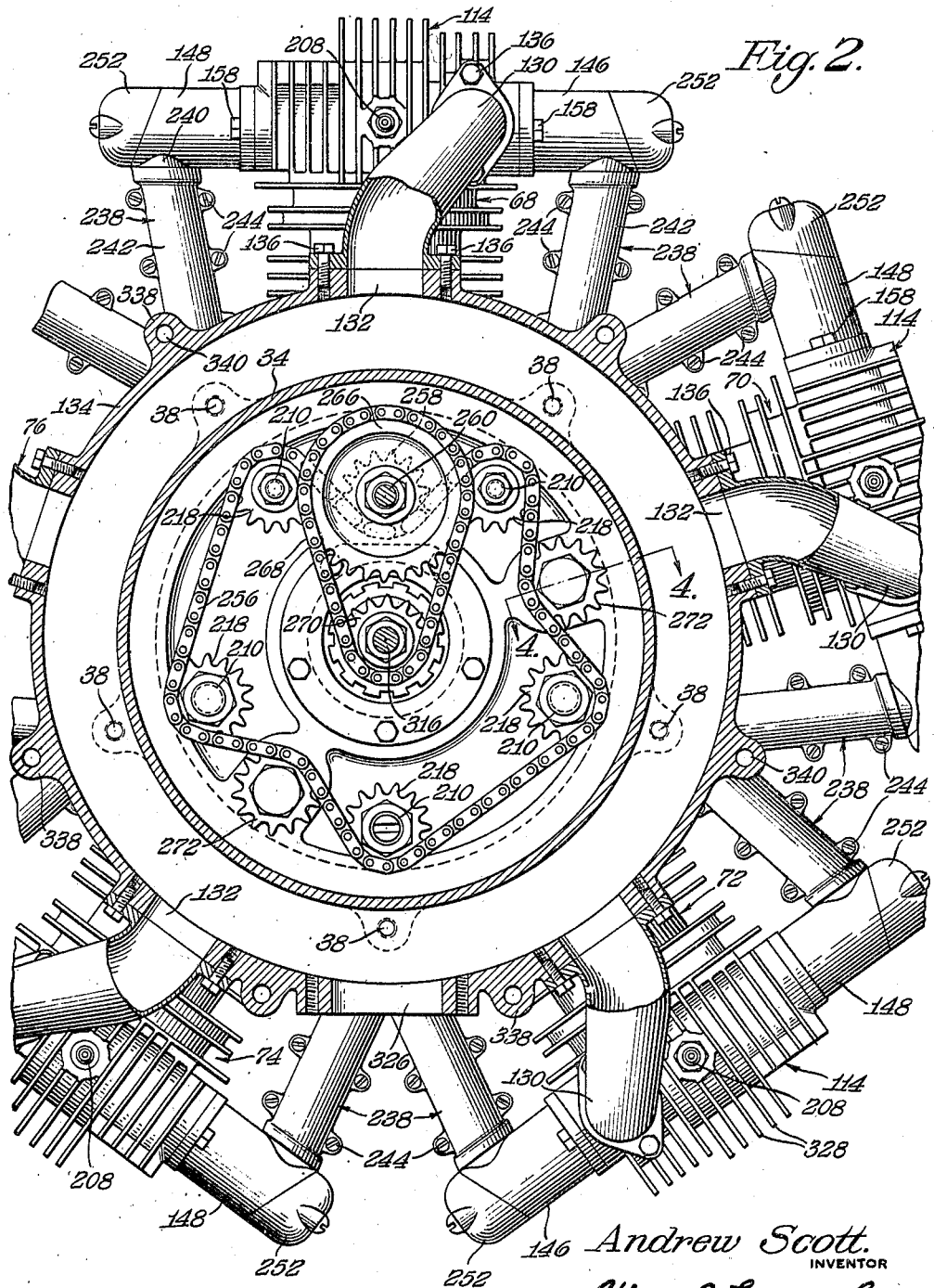

May 23, 1944.   A. SCOTT   2,349,383
AIRCRAFT ENGINE
Filed April 9, 1941   3 Sheets-Sheet 3
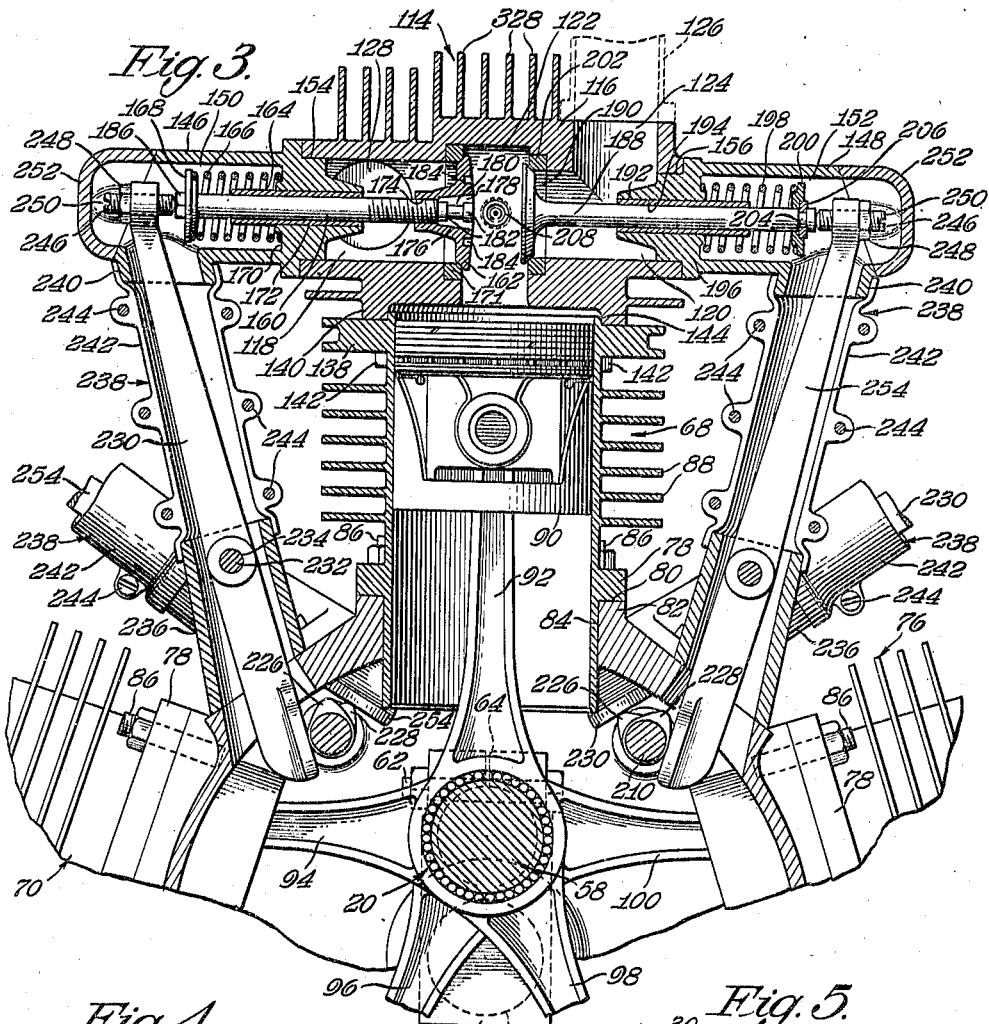
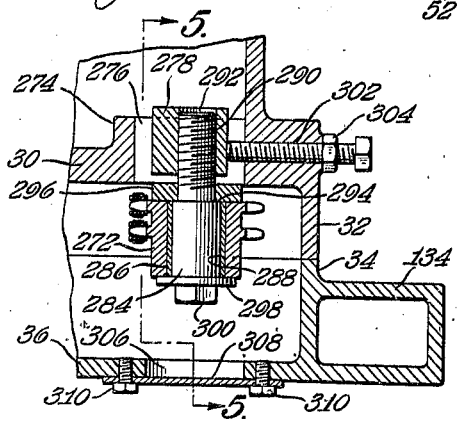
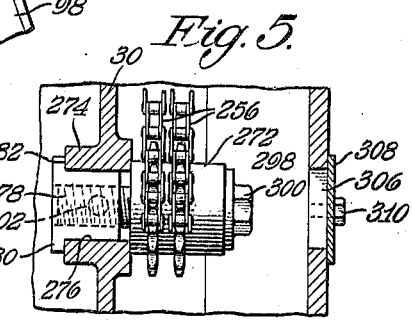
Andrew Scott.
INVENTOR
BY Victor J. Evans & Co.
ATTORNEYS Patented May 23, 1944

2,349,383

UNITED STATES PATENT OFFICE 2,349,383

AIRCRAFT ENGINE

Andrew Scott, Gary, Ind.

Application April 9, 1941, Serial No. 387,738

3 Claims. (Cl. 123—188)

My invention relates to internal combustion engines, and has among its objects and advantages the provision of an improved aircraft engine.

An object of my invention is to provide an engine of the type described wherein a novel valve structure is incorporated and designed so as to facilitate assembly and removal of the parts, with the structure embodying an element of simplification and relatively few parts.

A further object is to provide an engine embodying a series of camshafts together with a novel drive for the camshafts.

Another object is to provide an engine embodying a novel construction and arrangement of rocker arms and connecting rods with the engine designed with a view to securing effective balance, high speed with resultant power gain.

In the accompanying drawings:

Figure 2 is a sectional view along the line 2—2 of Figure 1;

Figure 3 is a sectional view along the line 3—3 of Figure 1;

Figure 4 is a sectional view along the line 4—4 of Figure 2; and

Figure 5 is a sectional view along the line 5—5 of Figure 4.

Figure 1:
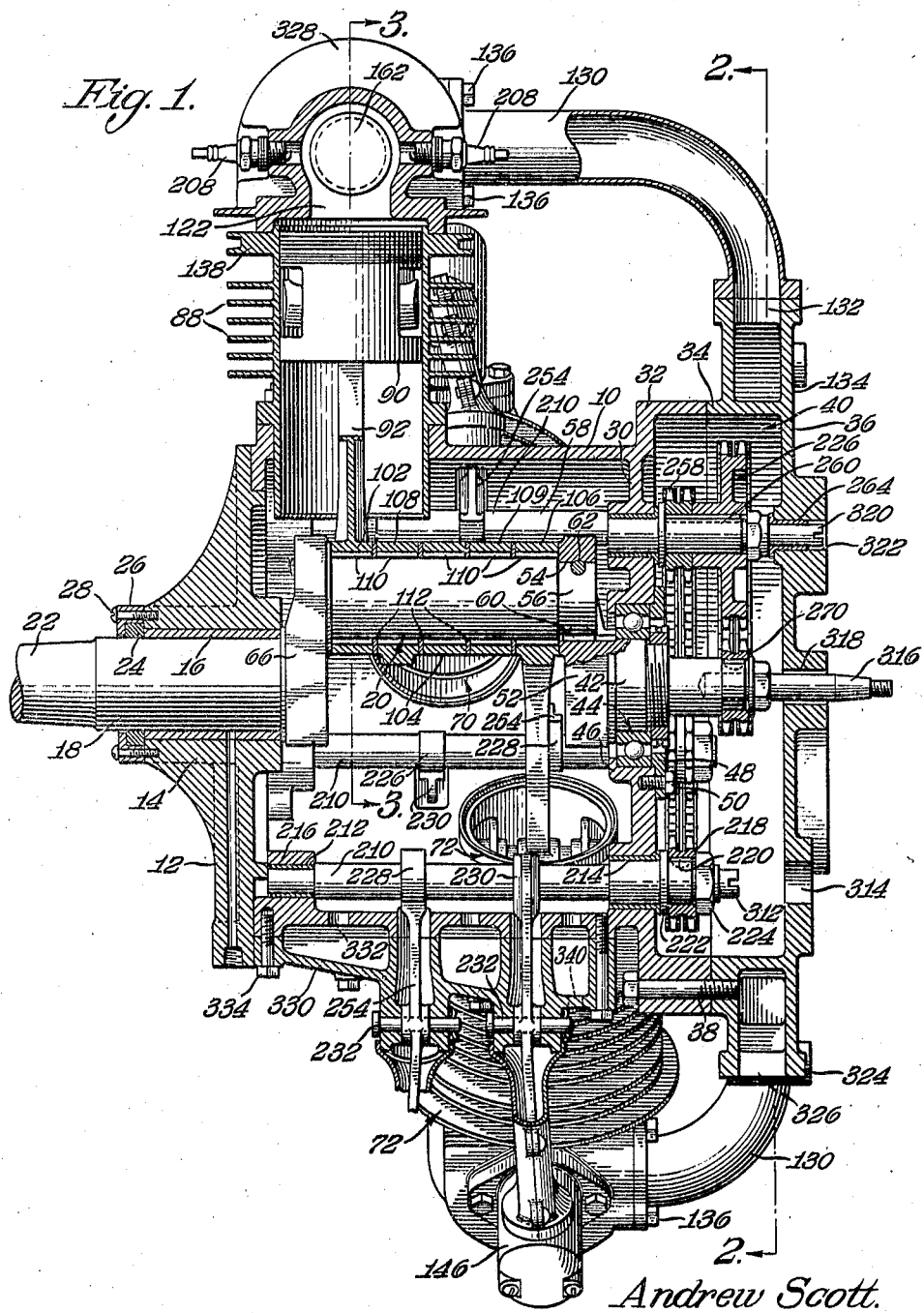
Figure 1 is a sectional view of the engine in accordance with my invention, with the plane of the section substantially corresponding to the axis of the crankshaft but with the latter illustrated in elevation.

In the embodiment selected to illustrate my invention, I make use of a crank case 10 having an end plate 12 bolted to one end thereof, which end plate is provided with a boss 14 bored to receive a bearing bushing 16 which supports the bearing pin 18 of the crankshaft 20. Pin 18 is extended at 22 for connection with the propeller, and a seal 24 abuts the outer ends of the bushing 16 and the boss 14 and is held thereagainst by reason of a retainer 26 secured to the boss by bolts 28.

The opposite end of the crank case 10 is provided with a wall 30 and an annular flange 32 having edge to edge engagement with the flange 34 of a cover plate 36. Bolts 38 fixedly secure the two flanges 32 and 34 and these flanges cooperate with the wall 30 and the plate 36 to provide a chamber 40 in which the driving means for the camshafts are located.

The second pin 42 of the crankshaft is supported by a bearing 44 held in the annular flange 46 by a retainer 48 bolted at 50 to the wall 30. Pin 42 is fashioned integrally with the crank arm 52 and the latter is bored at 54 to receive the short shaft 56 at one end of the crankpin 58. A key 60 secures the arm 52 to the shaft 56 and the two parts are additionally secured by means of a bolt 62 intersecting the peripheries of the shaft 56 and the bore 54. The arm 52 is split, as at 64 in Fig. 3, so that tightening of the bolt 62 additionally secures the arm 52 to the shaft. The second crank arm 66 to which the pin 18 is secured is formed integrally with the crankpin 58.

Spaced circumferentially of the crank case 10 are five cylinders 68, 70, 72, 74 and 76. In accordance with Figs. 1 and 3, the cylinder 68 has a flange 78 fitted against the face 80 of the boss 82 on the crank case 10. This boss is bored at 84 for the reception of the inner end of the cylinder and the flange 78 is made secure to the crank case by bolts 86. All the cylinders are identical in construction, so that the description of one will apply to all. Each cylinder is also provided with heat dissipating fins 88.

The pistons 90 of the cylinders 68 through 76 are connected with the crankpin 58 by connecting rods 92, 94, 96, 98 and 100, respectively. The connecting rods 92 through 100 are respectively provided with bearings 102, 104, 106, 108 and 109, see Fig. 1, which illustrates the order in which the connecting rods are connected with the crankpin 58. The connecting rods are of equal lengths, and all the rods are connected with the crankpin 58 of a single throw crankshaft.

The bearings 102 through 108 are respectively provided with needle bearing rollers 110, the groups being separated by spacing washers 112 which also separate the bearings one from the other.

Each of the cylinders 68 through 76 is provided with a valve chamber 114, these being identical in construction so that the description of one will apply to all. In Fig. 3, the valve chamber 114 includes a body 116 provided with axially aligned intake and exhaust passages 118 and 120, respectively, communicating with a chamber 122 having communication with the cylinder 68. Passage 120 communicates with a right-angular passage 124 for exhausting into a suitable conduit 126, and the passage 118 has communication with a bore 128 communicating with a tube 130, see Fig. 1, communicating with the port 132 in the intake manifold 134, extending circumferentially about the flange 34. The intake manifold 134 supplies all the cylinders and extends completely about the flange 34, as best illustrated in Fig. 2. The tubes or elbows 130 are secured to the respective bodies 116 and the intake manifold 134 by bolts 136. In Fig. 3 the cylinder 68 is provided with a relatively heavy flange 138 to which the annular flange 140 of the body 116 is secured by bolts 142, and the flange 140 is centered with respect to the cylinder by reason of the cylinder flange 144.

Valve chamber cages 146 and 148 are secured to the valve body 116. These valve cages are provided with axially aligned bores 150 and 152, respectively. Bearing faces 154 and 156 are provided on the cages 146 and 148, respectively, which are respectively pressed into the passages 118 and 120. Bolts 158 secure the cages to the valve chamber body 116, as in Fig. 2.

The stem 160 of the intake valve 162 is slidably guided in a bushing 164 in the valve cage 150. A compression spring 166 is interposed between the flange 168 on the valve stem 160 and the wall 170 of the valve cage for yieldingly holding the valve 162 seated on the valve seat insert 171. The bushing 164 is pressed into a bore 172 in the wall 170 on which the annular face 154 is fashioned.

The valve 162 is threadedly connected with the stem 160, as at 174, and the valve is provided with a conical bore 176 for the reception of a split taper key 178 fitting snugly inside the bore and having a flange 180 fitting between the spaced abutments 182 on a reduced diameter reach of the stem 160 extended into the bore 176. Recesses 184 are provided in the valve 162 for coaction with a spanner wrench, and the opposite end of the valve stem is provided with a nut 186 for the reception of a wrench to facilitate turning of the valve on the threads of the valve stem.

The valve stem 188 of the exhaust valve 190 is slidably guided in a bushing 192 secured in the bore 194 in the wall 196 of the valve cage 148, the bushing 192 being axially aligned with the bushing 164. A compression spring 198 is interposed between the wall 196 and a flange 200 on the valve stem 188 for yieldingly holding the valve 190 against the valve seat insert 202. A groove 204 is cut in the valve stem 188 for the reception of a horseshoe washer 206, which holds the flange 200 in place against the tension of the compression spring 198. Two spark plugs 208 are threaded into the valve chamber body 116 for the chamber 122.

Five camshafts 210 are employed. These camshafts are equally spaced circumferentially about the axis of the crankshaft 20 and are identical in construction. Fig. 1 illustrates one of the camshafts 210, which camshaft is supported in bushings 212 and 214 secured to a lug 216 and the wall 30, respectively, the crankshaft extending beyond the wall 30 for connection with a double chain sprocket 218 keyed to the camshaft, as at 220. The sprocket is clamped firmly against a flange 222 on the camshaft through the medium of a nut 224 threadedly connected with the camshaft.

Each camshaft is provided with an intake cam 226 and an exhaust cam 228, respectively, see Fig. 3. In this view, a rocker arm 230 is provided for coaction with the valve stem 160 and the cam 226. A bolt 232 is receivable in the bore 234 in the rocker arm 230, which bore is located intermediate its ends, and the bolt 232 is supported by a tube 236 bolted to the crank case 10. A split tube 238 has one end embracing the outer end of the tube 236 and its outer end embracing an annular flange 240 on the valve cage 146.

The tube 238 is split longitudinally and its sections 242 are clamped together by bolts 244.

To the outer end of the rocker arm 230 is secured an adjustable screw 246 for engagement with the valve stem 160, and the adjusting screw is secured against accidental rotation by a lock nut 248, in addition to being provided with a screw driver receiving slot 250. Access to the screw 246 may be had by removing the cap 252 bolted to the valve cage 146.

Since the rocker arm 254 coacting with the cam 228 and the exhaust valve stem 188 is identical with the rocker arm 230 and its associated structure, corresponding reference numerals are applied to corresponding parts. The cams 226 and 228 on the respective camshafts 210 are spaced longitudinally on the shafts to accommodate the staggered alignment of the cylinders 68 on the crank case 10. Thus the cam 228 on the shaft 210 to which the cam 226 is connected for operating the rocker arm 230, is located for actuating the rocker arm 254 associated with the exhaust valve of the cylinder 70. Similarly, the cam 226 on the other camshaft illustrated is arranged to actuate the rocker arm 230 associated with the intake valve of the cylinder 76.

The intake valve 162 may be removed by way of the chamber 122. In removing this valve, a spanner wrench is connected with the valve and the valve stem 160 turned for threading the stem further into the valve. This brings the split tapered key 180 sufficiently far outside the conical bore 176 to permit the parts thereof to be removed, after which the stem may be unscrewed from the valve and the latter removed through the chamber 122, assuming, of course, that the valve body 116 has been removed from the cylinder 68.

The valve 190 may be removed with its stem 188 by detaching the horseshoe washer 206 and pushing the valve through the bore 118. Removal of the valve cage 146 permits the valve 190 to be pulled completely outside the valve body 116. Thus the valve 190 may be placed in position as well as removed without detaching the valve cage 148 from the valve body 116.

Each of the camshafts 210 is provided with a double sprocket 218 for coaction with two chains 256 which are driven by a double sprocket 258 secured to a shaft 260 supported in bearings 262 and 264 in the wall 30 and plate 36, respectively, see Fig. 1. A double sprocket 266 is keyed to the shaft 260 and is driven by two chains 268 passing over the double sprocket 270 keyed to the crankshaft 20. Because of the length of the two chains 256, tightening sprockets 272 are provided.

Chain tightening sprockets 272 are located as near as possible to positions on diametrically opposite sides of the axis of the crankshaft 20 so as not to disturb accurate timing of the camshafts through wear of the chains and reduction of slack therein at one point only.

Figs. 4 and 5 illustrate one of the chain tightening sprockets 272. Both sprockets are mounted in the same manner. The wall 30 is provided with a boss 274 having an opening 276 for the reception of a block 278 which fits snugly inside the opening when viewed according to Fig. 5 but which may be adjusted in either direction when viewed according to Fig. 4. A flange 280 is carried by the block to engage the face 282 of the boss 274.

A shaft 284 rotatably supports the sprocket 272 through the medium of the bushing 286 secured in the bore 288 of the sprocket. A threaded shaft 290 is threaded into the bore 292 of the block 278, and the shaft 290 is of reduced diameter with respect to the shaft 284 to provide a shoulder 294 which abuts a spacing washer 296 lying against the wall 30. A flange 298 is formed on the shaft 284 and the latter is provided with a nut 300 to facilitate turning of the shaft. Thus the sprocket is restrained from relative longitudinal movement by reason of the spacing washer 296 and the flange 298 and the block 278 is firmly secured in position when the threaded shaft 290 is turned tightly home, since the block is spaced slightly from the spacing washer 296.

An adjusting screw 302 is threaded into the boss 274 and abuts the block 278. This bolt is made secure against accidental rotation by a lock nut 304 engaging the flange 32. Cover plate 36 is provided with a work opening 306 axially aligned with the shaft 284, which opening is normally closed by a plate 308 removably secured to the plate 36 by bolts 310.

One of the camshafts 210 of Fig. 1 is provided with a notched end 312 to which the oil pump (not shown) may be connected, an opening 314 being provided in the plate 36 to facilitate connection with the end 312. The magneto of the engine may be connected with the shaft extension 316 coaxial with the axis of the crankshaft 20 and extending through an opening 318 in the plate 36. The shaft 260 is provided with a notched end 320, accessible through an opening 322 in the plate 36 for connection with a tachometer. The carburetor may be attached to the boss 324 on the manifold 134, which boss is provided with a fuel passage 326.

Heat dissipating fins 328 are provided on the bodies 116 of the valve heads 114.

In Fig. 4, an oil sump 330 is bolted to the bottom of the crank case 10 and the wall of the crank case is provided with oil draining openings 332. The sump is secured to the crank case by bolts 334 and is provided with an opening 336, through the medium of which oil may be drained from the sump in the usual manner.

The manifold 134 is provided with a series of ears 338 provided with openings 340 for the reception of bolts which may be employed for securing the engine to an anchor plate.

Without further elaboration, the foregoing will so fully illustrate my invention that others may, by applying current knowledge, readily adapt the same for use under various conditions of service.

I claim:

1. In an engine of the type described, the combination of a valve stem having spaced abutments at one end thereof, a valve head threadedly connected with said stem, and having a conical bore adapted to surround said abutments, and key means engaging said abutments and coacting with the wall of said bore to be clamped into holding engagement with said abutments when the valve is turned relatively to the stem in one direction, to fixedly locate the stem and the valve head.

2. In an internal combustion engine, the combination of a valve stem having spaced abutments at one end thereof, a valve head threadedly connected with said stem, and having a conical bore extending about said abutments, key means in said bore engaging said abutments, and coacting conical faces on said key means and the wall of said recess, for clamping said key means into holding engagement with said abutments when the valve is turned relatively to said stem in one direction for fixedly locating the stem and the valve head.

3. In an internal combustion engine, the combination of a valve stem having spaced abutments at one end thereof, a valve head threadedly connected with said stem, and having a tapered bore extending about said abutments, and split keys having formations fitting between said abutments and with tapered faces engaging the wall of said tapered bore to be clamped between said spaced abutments, and fixedly locate the valve head and the valve stem when the valve head is rotated relatively to the stem in one direction.

ANDREW SCOTT.